UNITED STATES PATENT OFFICE.

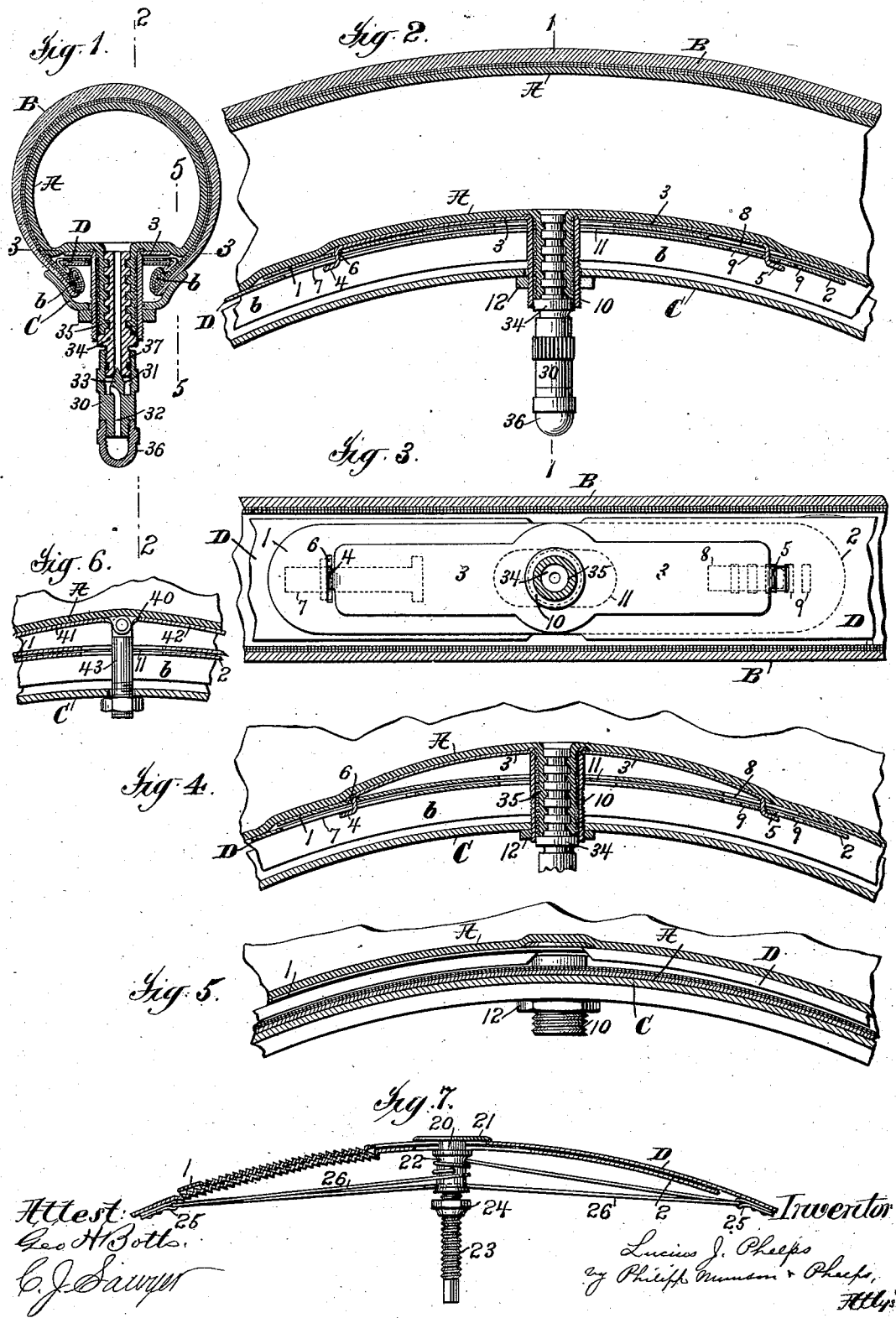

LUCIUS J. PHELPS, OF BOSTON, MASSACHUSETTS.

WHEEL-TIRE.

SPECIFICATION forming part of Letters Patent No. 548,926, dated October 29, 1895.

Application filed March 14, 1894. Serial No. 503,548. (No model.)

*To all whom it may concern:*

Be it known that I, LUCIUS J. PHELPS, a citizen of the United States, residing at Boston, county of Suffolk, and State of Massachusetts, have invented certain new and useful Improvements in Wheel-Tires, fully described and represented in the following specification and the accompanying drawings, forming a part of the same.

This invention relates to pneumatic tires such as are now commonly used on the wheels of bicycles and other vehicles; and the invention relates more particularly to an improved means for attaching the tire to the wheel-rim.

As a full understanding of the invention can best be given by a detailed description of a construction embodying the invention in the preferred form, all further preliminary description will be omitted and such a detailed description will now be given and the features forming the invention then specifically set forth in the claims, reference being had to the accompanying drawings, forming a part of the specification, in which—

Figure 1 is a cross-sectional view of a tire and wheel-rim, taken on line 1 of Fig. 2, showing the overlapped ends of my improved clamping-band. Fig. 2 is a section taken on line 2 of Fig. 1. Fig. 3 is a section taken on line 3 of Fig. 1. Fig. 4 is a view taken similar to Fig. 2, but partly broken and showing the parts before the clamping-band is tightened. Fig. 5 is a broken section on line 5 of Fig. 1. Figs. 6 and 7 show modified forms of clamping devices.

Referring first to Figs. 1 to 5, the tire, as shown, consists of the inner inflation-tube A, forming the air-chamber, and the outer cover or restraining and protecting envelope B, forming the tire proper and consisting of a hollow circular cylinder, preferably of vulcanized india-rubber, canvas lined, and open longitudinally on the inner side to allow of the insertion of the inflation-tube and of the tire being secured to the rim by its edges.

The edges of the tire are provided on the inner side with undercut or backwardly-projecting beads or enlargements, forming inwardly and backwardly projecting hooks $b$, and preferably formed by one or more folds of canvas vulcanized with rubber to give the necessary firmness. By providing an undercut hook-shaped bead, as shown, I am enabled to secure the tire more firmly to the rim, as such hook-shaped beads afford a better grip for the opposite edges of a clamping-band adapted to clamp the tire against the opposite sides of the rim, and especially is this so with my improved clamping-band of this kind, having hooked edges to engage the beads on the tire.

The rim C may be of any suitable shape, but a preferred form is shown in the drawings.

The tire is held to the rim by a wide band or plate of metal D, extending circumferentially around the rim, the part of the tire just within the beads being held between the opposite edges of the band and the sides of the rim. The edges of the band D are turned downwardly, preferably for about an eighth of an inch, so as to form hooks engaging the hooked beads $d$ of the tire, the angle at which the edges are turned being preferably such that they lie substantially parallel with the sloping sides of the rim C, as shown, the object of this feature being that the part of the tire between the edges of the band and the rim shall be thus held between two parallel surfaces, whereby the tire is held more firmly and the strains on the beads $d$ are greatly reduced, as all bending of the tire when the band is tightened will be at least so far from the beads as the width of the turned edge of the band, instead of being just at the inner edge of the bead, as is the case when a band is used which is not provided with such inclined faces parallel with the inclined surfaces of the rim.

I have devised an improved means for tightening bands by which tires are held on the rims, which I have shown as applied to my improved clamping-band, consisting of a toggle connection between the ends of the band, whereby when the toggle is straightened the band will be tightened. A preferred form of this part of the invention is illustrated in Figs. 1 to 5, in which the toggle is in the form of a curved flat spring 3, connecting the overlapping ends 1 and 2 of the band, being connected thereto preferably in the manner shown, the spring having hook-like ends 4 and 5, which are preferably narrower than the spring. The end 4 extends through a narrow opening 6 in the overlying end 1 of the band and through a longitudinal slot 7 in the band beneath the overlying end 1. To prevent it from withdrawing from the slot 7 the end 4 is preferably enlarged beyond the slot, the slot being widened at one end, as indicated in dotted lines in Fig. 3, to allow the end to be inserted and withdrawn when desired. The other end 5 of the spring extends through a longitudinal slot 8 in the band and through a narrow opening 9 in the underlying end 2 of the band, being bent as shown to prevent its withdrawing from the slot 9. The overlapping ends of the band are thus held together and allowed a certain amount of play, depending on the length of the longitudinal slots in the band and the length and flexibility of the spring. By pressing the central part of the spring toward the band—that is, from the tread side of the tire in the construction selected for illustration—the distance between its ends being increased, the ends of the band will be further overlapped and the band consequently shortened; and if the central part of the spring be drawn away from the band the ends of the band will thereby be moved so as to lengthen the band, as will be readily understood by reference to the drawings.

I prefer to provide the spring with a projection passing through slots 11 in the overlapping ends of the band and through an opening in the rim C, as I thus provide a convenient means for positively locking the clamping-band and for loosening the band when desired; but the toggle connection may be used with fair results without means for positively locking it when the band is tightened, the inflation-tube pressure being depended upon for this purpose, and it will be understood that provision for locking may be made in any other suitable manner. This projection may be of any suitable form, but is preferably a sleeve 10, which is preferably threaded to receive a lock-nut 12 inside the rim. The object of using a sleeve, as shown, is to provide a passage for the air-inlet or valve-stem leading to the inflation-tube, thus avoiding the necessity of making other openings in the band and rim for the valve-stem and avoiding injurious strains on the valve-stem by movement of the band where the valve-stem passes through it. It will be understood, however, that the valve-stem may pass through the band and rim at any other desired point. By passing the valve-stem through the sleeve it will be strengthened and protected, and as the sleeve is held from movement longitudinally to the tire by the rim, the valve-stem will not be subjected to any injurious strains.

In attaching the tire to the rim the parts are placed in position with the beaded edges of the cover or tire proper in the rim, the clamping-band inside the tire in position to clamp the tire just beyond the beaded edges between the sides of the rim and the turned edges of the band, and having the sleeve 10 in or opposite to the opening in the rim and the air-tube within the tire, and having its valve-stem extending through the sleeve 10. The spring 3 and the overlapping ends of the clamping-band will be in the position shown in Fig. 4. When the parts are in position, the spring is pressed down against the band by pressing in the tread of the tire against the spring, and held in that position by screwing the lock-nut 12 against the rim. The band being of the proper size, will be thus tightened so as to secure the tire securely between the rim and the inclined edges of the band. The tire can then be inflated. By providing a number of the narrow openings in one or both of the overlapping ends of the band the size of the band may be adjusted to varying sizes of rims or stretch of the band compensated for.

When it is desired to expose a portion of the inflation-tube or to entirely remove the tire from the rim, the tire is first deflated, and then the lock-nut 12 is unscrewed and the sleeve 10 pushed up, so as to flex the spring 3 away from the band, thereby moving the ends of the bands, so as to lengthen the band. The beaded edges of the tire can then be easily drawn out from beneath the band.

In Fig. 6 is shown a modification of the device just described, in which, instead of the spring 3, I use a toggle 40, having two arms 41 42, pivoted or hinged together and having their longitudinally-moving ends attached to the overlapping ends of the band, preferably in the manner in which the ends of the spring 3 have been described as attached, or in any other suitable manner. A stud or projection 43 is pivotally connected to the hinged transversely-moving ends of the arms 41 and 42, and passes through the slots 11 in the overlapping ends of the band and through the opening in the rim, and is threaded to receive a lock-nut on its inner end. In place of the stud 43 a sleeve may be used, as before, the arms being pivoted to the sleeve so as not to interfere with the valve-stem. It is evident that the operation is the same as with the spring, both constructions acting as a toggle to shorten the band when the stud or sleeve is moved inward toward the center of the wheel—that is, when the toggle is straightened. Any other suitable form of toggle than those shown may also be used; but the construction employing a spring as described is the preferred form, as it is simpler and more compact and holds the band normally partly expanded.

It will be understood that my improved means for tightening the band forms in itself a part of the invention, independent of the form of the band with which it is used, and may be used with any other form of band or similar device for holding the tire on the rim.

It will also be understood that the term "band" as used in the claims is not to be limited to a wide band such as is shown, by which both edges of the tire are clamped to the opposite sides of the rim; but it is to be understood as including a ring or similar device of any suitable construction, size, or width, by which the tire or one or both edges of the tire is held on the rim.

It will also be understood that any other suitable means may be used for tightening my improved form of clamping-band—as, for example, the device shown in Fig. 7—in which the ends of the band, which preferably overlap as before, are longitudinally slotted to receive a stud 20, provided with a retaining-plate 21 on the outside of the band and a drum or barrel 22 on the inside of the band, and having a shank 23, adapted to extend through an opening in the rim and screw-threaded to receive a lock-nut 24.

A loop or eyelet 25 is fastened on the inside of the band near each end, but farther from the end than the stud is, so as to be between the stud and the central portion of the band, and through these eyelets passes an endless cord 26, which thus forms an endless loop holding the ends of the band together. The cord also passes through a hole in the drum 22, so that if the drum be revolved the cord will be wound thereon and the loop connecting the two ends of the band will be shortened, thus further overlapping the ends, shortening and tightening the band. By screwing down the lock-nut 24 the drum will be securely clamped against the rim to prevent the cord from unwinding. With this device, as is customary where a tightening device is used which takes up both ends of the band equally, the valve-stem will preferably pass through openings in the band and rim on the opposite side of the wheel, the opening in the band being half-way between its ends, as at that point there will be no longitudinal movement of the band in tightening; but with such an arrangement it has been a matter of great difficulty heretofore to provide against some longitudinal movement in tightening of the band where the valve-stem passes through it, by which the valve-stem might be injured. It will be noticed that this device is self-adjusting, so that even though there be such an unevenness in the rim or edges of the tire that the distance is not quite the same both ways from the valve to the point of take-up, or if the valve-stem does not pass through the band or the rim at quite the right point, yet no injurious strain can be brought on the valve-stem, for as the cord 26 is free to slide through the eyelets 25 both halves of the band will be drawn equally tight. Instead of using an endless cord, as shown, a cord might be used passing through the eyelets 25 and having its ends fastened to the drum with a like result. The overlapping ends of the band are preferably correspondingly notched or corrugated, as shown, to provide an additional safeguard against the ends drawing apart when the tire is inflated, the inflation-tube then pressing the overlying end of the band against the part of the band beneath it. The end of the shank 23 is preferably made angular to permit it being turned by a wrench or key.

A preferred form of valve is shown in Figs. 1 to 4. The body of the valve consists of a cylindrical casing 30, having a larger bore 31 in its lower part and a smaller bore or air-passage 32 in its upper part. A conical valve-plug 33 extends into the chamber formed by the larger bore, the smaller bore being turned to enter the larger bore or chamber 31 above the conical plug 33. The larger bore is internally threaded to screw onto the threaded end of a tube 34, which is secured within the hollow rubber stem 35, opening into the inflation-tube and secured thereto in any suitable manner or formed integral therewith, as shown.

The upper end of the tube 34, which should be of some soft metal, such as soft brass, forms a single contact-line seat for the conical plug 33, which is of very hard aluminum bronze or other very hard metal. By screwing down the casing 30 on the tube 34 the plug 33 is firmly seated in the end of the tube, making a perfectly air-tight and reliable joint. To inflate or deflate, the valve body or casing is unscrewed, thus drawing the valve away from the tube 34 and allowing free passage for the air through the air-passage 32, chamber 31, and tube 34 to the inflation-tube.

For inflating, an air-pump is connected to the threaded upper end of the valve-body, the pump being provided with a check-valve. A dust-cap 36 is provided to screw onto the end of the valve-body when the pump is removed.

To prevent escape of air through the threads in inflating, I provide a small ring of packing 37 in an annular groove cut in the threads near the end of the tube 34. The valve-body 30 is long enough so that it may at all times be screwed onto the tube 34 far enough to cover the ring or packing, thus preventing any passage of air between the threads, even when the valve-body is screwed up to open the valve. The packing is preferably applied by winding a suitably-prepared thread into the groove.

Although the invention has been described in connection with a compound pneumatic tire having an inner tube and an outer covering or tire proper, and is especially applicable to tires of this form, yet it will be understood that the invention may be applied to any form of flexible tire where devices, as defined by the claims, may be used to hold the tire to the wheel-rim.

Various changes and modifications in the constructions herein shown and described, which will suggest themselves to one skilled in the art, may be made without departing from the spirit of the invention.

What I claim is—

1. The combination with a tire, and a wheel rim, of a band for holding the tire on the rim, a toggle connecting the ends of the band and operating to tighten the band when the toggle is straightened, and means for locking the toggle in its straightened position, substantially as described.

2. The combination with a tire and a wheel rim, of a band for holding the tire on the rim having overlapping ends, and a toggle connecting the ends of the band and operating to shorten the band when the toggle is straightened, substantially as described.

3. The combination with a tire and a wheel rim, of a band for holding the tire on the rim having overlapping ends, a toggle connecting the ends of the band and operating to shorten the band when the toggle is straightened, and a means for locking the toggle in its straightened position, substantially as described.

4. The combination with a tire and a wheel rim, of a clamping band having overlapping ends, a toggle connecting the ends of the band, and lying on the outside of the band and arranged to straighten toward the rim, and operating to shorten the band when the toggle is straightened, substantially as described.

5. The combination with a tire and a wheel rim, of a clamping band having overlapping ends, a toggle connecting the ends of the band and operating to shorten the band when the toggle is straightened, a projection carried by the toggle and passing through the rim, and a means for locking the projection after the toggle is straightened, substantially as described.

6. The combination with a tire and a wheel rim, of a clamping band having overlapping ends, a toggle connecting the ends of the band and operating to shorten the band when the toggle is straightened, a sleeve carried by the toggle and passing through the rim, and a lock nut adapted to screw onto the end of the sleeve, substantially as described.

7. The combination with a tire and a wheel rim, of a clamping band having overlapping ends, and a curved spring holding the ends of the band together and the ends of which are connected to the overlapping ends of the band so that when the spring is straightened the band will be shortened, substantially as described.

8. The combination with a tire and a wheel rim, of a clamping band having overlapping ends, and a curved spring holding the ends of the band together and the ends of which are connected to the overlapping ends of the band so that when the spring is straightened the band will be shortened, a sleeve carried by the spring and extending through the overlapping ends of the band and through the wheel rim, and a lock nut adapted to screw onto the end of the sleeve, substantially as described.

9. The combination with a tire and a wheel rim, of a clamping band having overlapping ends, a curved spring having one end formed to extend through an opening in the overlying end of the band and a longitudinal slot in the band under the overlying end, and having the other end formed to extend through an opening in the underlying end of the band and a longitudinal slot in the band over the underlying end, a sleeve carried by the spring and extending through longitudinal slots in the overlapping ends of the band and through an opening in the rim, and a lock nut adapted to screw onto the end of the sleeve, substantially as described.

10. The combination with a wheel rim having sloping sides, of a tire having enlarged edges, an inflation tube within the tire, a clamping band having hooked edges lying substantially parallel with the sloping sides of the rim, and a toggle connecting the ends of the band and operating to shorten the band when the toggle is straightened, substantially as described.

11. The combination with the wheel rim C, of the tire B having its edges provided with inwardly extending hook-shaped beads, an inflation tube A within the tire, a clamping band D having its ends overlapped and having hooked edges lying substantially parallel with the sloping sides of the rim C, curved spring 3 having its ends connected to the overlapping ends of the band, a longitudinal slot being provided in the band through which one end of the spring passes to reach the underlying end of the band, a sleeve 10 carried by the spring and extending through slots in the overlapping ends of the band and through an opening in the rim, and a lock nut adapted to screw onto the end of the sleeve, substantially as described.

In testimony whereof I have hereunto set my hand in the presence of two subscribing witnesses.

LUCIUS J. PHELPS.

Witnesses:
WILLIS SMITH,
W. E. ODEN.